(12) United States Patent
Martin

(10) Patent No.: US 6,952,480 B1
(45) Date of Patent: Oct. 4, 2005

(54) SELF-SYNCHRONOUS DATA SCRAMBLER

(75) Inventor: Gary D. Martin, North Andover, MA (US)

(73) Assignee: Applied Micro Circuits Corporation, San Diego, CA (US)

( * ) Notice: Subject to any disclaimer, the term of this patent is extended or adjusted under 35 U.S.C. 154(b) by 0 days.

(21) Appl. No.: 09/399,502

(22) Filed: Sep. 20, 1999

(51) Int. Cl.$^7$ ............................................... H04L 9/00
(52) U.S. Cl. ...................... 380/261; 380/210; 713/160
(58) Field of Search ................................. 370/371, 351, 370/389, 395.1, 395.5, 395.51; 713/160–164, 713/150–152; 709/236; 380/268, 200, 201, 380/210, 212, 221, 224, 225, 255, 270, 259–261, 380/274

(56) References Cited

U.S. PATENT DOCUMENTS

| | | | | |
|---|---|---|---|---|
| 3,927,267 A | * | 12/1975 | Voyer et al. ................. | 370/371 |
| 4,979,188 A | * | 12/1990 | Kotzin et al. ................ | 375/254 |
| 5,303,303 A | * | 4/1994 | White ......................... | 713/160 |
| 5,355,506 A | * | 10/1994 | Mariani ....................... | 709/236 |
| 5,442,703 A | * | 8/1995 | Kim et al. ................... | 380/271 |
| 5,444,782 A | * | 8/1995 | Adams et al. ............... | 713/153 |
| 5,638,448 A | * | 6/1997 | Nguyen ....................... | 380/29 |
| 5,825,888 A | * | 10/1998 | Kimura et al. .............. | 380/270 |
| 5,835,602 A | | 11/1998 | Lang ............................ | 380/49 |
| 5,881,154 A | * | 3/1999 | Nohara et al. ............... | 380/42 |
| 6,188,692 B1 | * | 2/2001 | Huscroft et al. ....... | 370/395.51 |

FOREIGN PATENT DOCUMENTS

| WO | WO 99/33271 | 1/1999 | .......... H04N 7/167 |
|---|---|---|---|
| WO | WO 99/29078 | 10/1999 | ........... H04L 27/26 |

OTHER PUBLICATIONS

Whatis.com, Time-Division Multiplexing, Aug. 16, 2002, p. 1.*

* cited by examiner

*Primary Examiner*—Christopher Revak
(74) *Attorney, Agent, or Firm*—INCAPLAW; Terrance A. Meador

(57) ABSTRACT

An encryption system has been provided to self-synchronously scramble communications where the receiver must recover the clock information from the data stream, such as the SONET format. To prevent jamming during initialization, or during times when no data is being transferred, flags and overhead data are scrambled, along with the payload. Timing controls to the scrambler permit this scrambler to be selectively engagable, so that the selective overhead scrambling becomes a second layer of scrambling. A method of self-synchronously scrambling the overhead in NRZ formatted communications is also provided.

17 Claims, 4 Drawing Sheets

SELF-SYNCHRONOUS DATA SCRAMBLER

BACKGROUND AND SUMMARY OF THE INVENTION

This invention relates to the field of digital data transmission and, more particularly, to the self-synchronous scrambling of a packet based transmissions using non-return-to-zero (NRZ) line coding that permits the recovery of the reference clock at the receiver.

NRZ encoded transmission systems are typically designed so the timing reference clock at the receiver is recovered solely from transitions in the received data signal. Information is reliably communicated over such systems if the transition density of the transmitted data sequence is sufficiently high. If the data sequence transition density is not adequate, the recovered timing reference clock in the receiver will not track the transmitter timing reference accurately enough to receive the data sequence error free. When the transition density is too low, the receiver timing reference becomes "unlocked" with respect to the transmitter timing reference, and communication between the transmitter and receiver is lost.

In order to ensure that adequate data transition density exists, many NRZ encoded transmission systems rely on scrambling to randomize the data prior to transmission. The SONET format, as described in GR-253-CORE "Synchronous Optical Network Transport Systems: Common Generic Criteria", Revision 1, December 1997, Bellcore, is an example of such a system. The frame synchronous SONET scrambler described in the above publication works well for Time Division Multiplexed (TDM) based payload mappings that interleave data from multiple sources into a single SONET frame. For payload mappings that accept data from a single source, the SONET frame synchronous scrambler may not be adequate. The SONET format suffers from two liabilities: 1) it is reset to the same value at the beginning of each SONET frame; and, more importantly, 2) the length of the sequence before repeating is only 127 bits.

Publication RFC-1619, "PPP over SONET/SDH", Issue 1, May 1994, Internet Engineering Task Force, defines a direct mapping of the HDLC (high-level Data link control) encapsulated packet based point-to-point protocol (PPP) into the SONET payload. As is noted in "Self-Synchronous Packet Scrambler", U.S. Pat. No. 5,835,602, invented by S. Lang, a malicious user may generate packets consisting of the SONET frame synchronous scrambler sequence. If such packets are transported using the mapping defined in RFC-1619, there is a non-trivial probability that the packet sequence would be aligned with the frame-synchronous SONET scrambler resulting in long sequences of ones or zeros that could disrupt the receive clock recovery circuit.

U.S. Pat. No. 5,835,602 describes a method of reducing the probability of the above-described disruption, which involves adding a self-synchronizing scrambler after the HDLC (protocol for X.25 packet switching networks) packet generation, but before the SONET frame generator. This provides protection as long as the malicious user has no knowledge of the state of the self-synchronizing scrambler. However, a user may have knowledge of the scrambler state at the start of transmission. The self-synchronizing scrambler is usually initialized to a pre-defined state (such as all ones). Then, if only HDLC idle flags are passed through the scrambler until the packet transmission is initiated, the self-synchronizing scrambler will be in one of a small number of states when packet transmission begins. Thus, a malicious user could still disrupt transmission with a non-trivial probability of success.

It would be advantageous if an improved method of SONET data scrambling could be derived that reduced the probability of a user guessing the pseudo-random scrambling pattern. It would be advantageous if the data could be scrambled in a way that would prevent a malicious user from transmitting a long string of "0"s or "1"s which prevent clock recovery.

It would be advantageous if the overhead sections of packetized data could be scrambled to reduce the possibility of guessing the scrambling code during initialization periods, or periods where no information is sent. It would be advantageous if the improved method of data scrambling could be made backward compatible with contemporary encryption schemes.

Accordingly, an improved scrambling system for the NRZ format communications is provided. The system is applicable to the transmission of HDLC data packets according to SONET protocols. The system comprises a frame generator to accept information to be transmitted. The frame generator organizes the information into frames, including both the information and system overhead. The input information may already be organized in another, distinct, communication format.

A self-synchronous scrambling circuit scrambles the frame input. That is, scrambling occurs after the information is organized into frames with the frame overhead. After transmission, a self-synchronous de-scrambling circuit recovers the received scrambled frames to provide received frames of information and overhead. A frame terminal removes the overhead information associated which each frame to provide the transmitted, or recovered information.

The frame generator divides each frame into time multiplexed sections. The information and overhead are loaded into different sections of the frame. The frame generator also provides the timing data, corresponding to the information and overhead frame periods, to the scrambler. The scrambler has the capability, then, of optionally scrambling frame sections in response to the timing data. Typically, the information portion of the frame is always scrambled. Optionally, the system has the potential of scrambling the overhead, except perhaps for the parts of the overhead that are required to locate frame boundaries. Further, the sub-sections of the overhead that are scrambled can be varied in patterns, providing yet another layer of system scrambling.

Likewise, the frame terminal has an output connected to the de-scrambler to provide timing data corresponding the frame information and overhead sections. The de-scrambler can be programmably engaged to de-scramble sections of the overhead in response to higher layer of scrambling protocol.

An improved method of scrambling communications in a NRZ formatted coding system is also provided. The method includes the steps of:
 a) accepting information to be transmitted;
 b) organizing the information into frames including information and overhead sections;
 c) scrambling the frames;
 d) de-scrambling the frames; and
 e) recovering the information from the frames (removing the overhead).

Step b) includes generating timing data to signal the occurrence of the information and overhead sections of the frames, and Step c) includes scrambling the frames in response the timing data signals of Step b). Likewise, Step e) includes generating timing data to signal the occurrence of the information and overhead sections of the received frames, and Step d) includes de-scrambling the received frames in response to the timing data signals of Step e).

In accordance with a higher layer of transmission encryption, Steps c) and d) can selectively scramble and de-scramble partial sections of overhead. Further, the overhead sub-section being scrambled may be constantly varied in a pattern that is decipherable to the message receiver, but cannot be known, before transmission, by a communication sender.

DETAILED DESCRIPTION OF THE PREFERRED EMBODIMENT

The present invention provides an improved method of data scrambling to reduce the probability of guessing the state of the scrambler. That is, the present invention reduces the likelihood of discovering the coding pattern, or the current position in the coding pattern. It does this by scrambling packet based mappings after insertion into a payload envelope, such as a frame. Such a framing format is used in a SONET system. A self-synchronous scrambler encrypts the data sequence after it is inserted into the frame. The input to the scrambler includes the packet data, the flag sequences used to delineate the packets, and the bits that are added to the data sequence to form the frame.

Inclusion of both the HDLC encapsulated packets and frame overhead bits in the input to the scrambler increases the number of possibilities for the current state of the scrambler, once packet transmission is initiated. That is, the coding is much more complex. It is harder for a malicious user to calculate or guess a sequence, that after passing through the self-synchronizing scrambler, matches the SONET scrambler (given the current states of these scramblers). The first SONET overhead bits inserted by the frame generator within the packet data after this matching begins, modify the state of the self-synchronizing scrambler, and so prevent a resulting run of transmitted ones or zeros.

Figure 1:
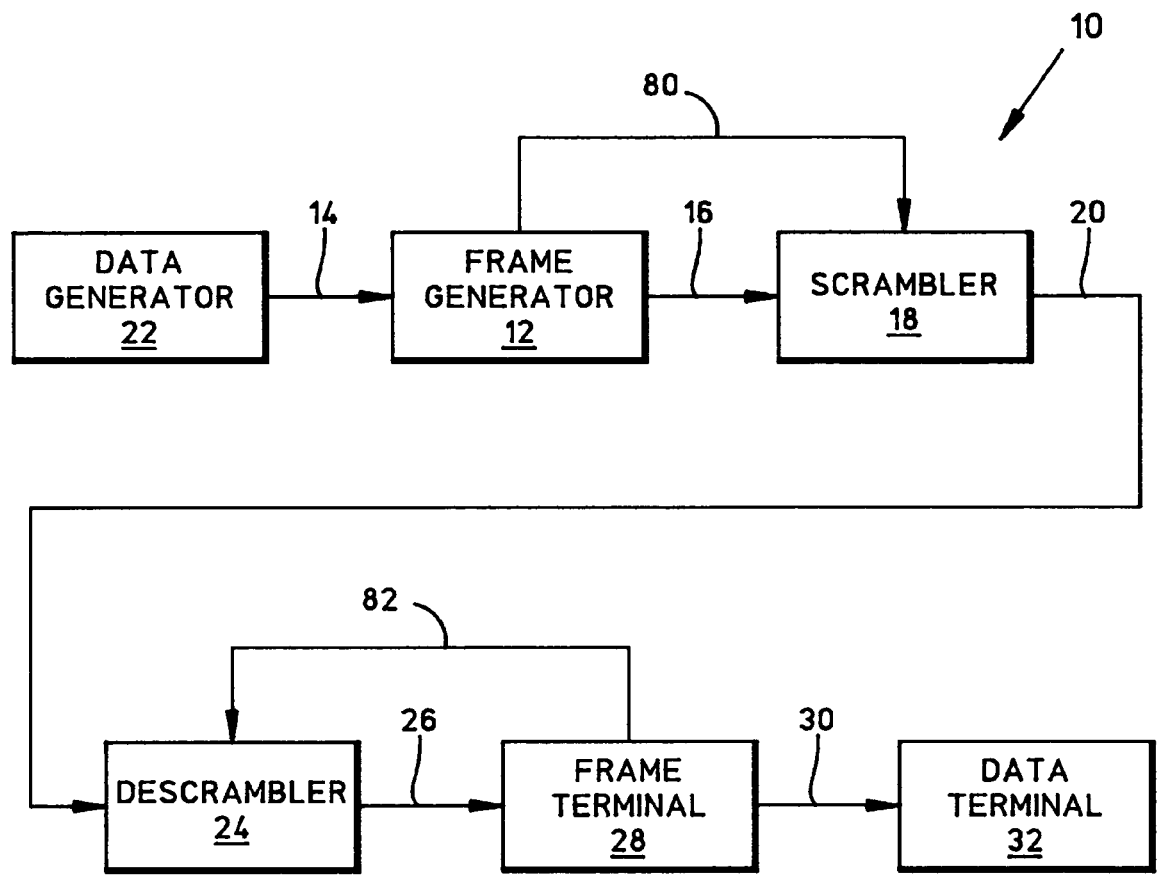
FIG. 1 is a schematic block diagram of the present invention transmission encryption system.

FIG. 1 is a schematic block diagram of the present invention transmission encryption system. Encryption system 10 is especially useful for the transmission of information encoded in a format using logic level transitions to derive the system clock, such as the NRZ format mentioned earlier. The system comprises a frame generator 12 having a first input on line 14 to accept information to be transmitted. Frame generator 12 organizes the information into frames including both the information and system overhead. Frame generator 12 has an output on line 16 to provide frames of information to be transmitted.

Figure 2:
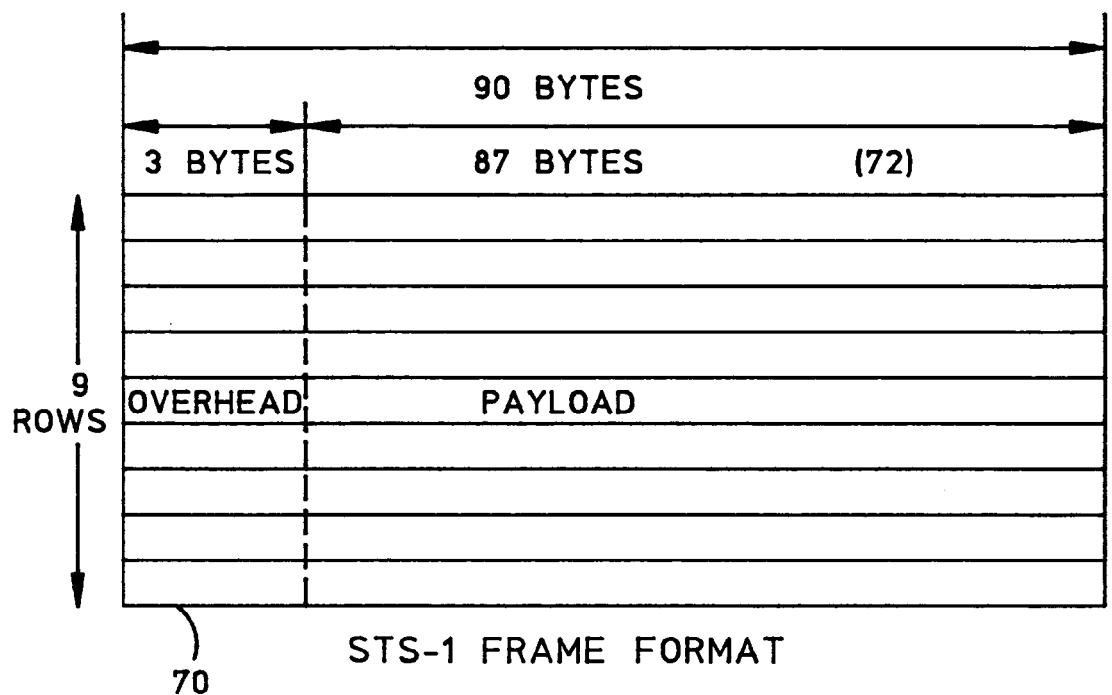
FIGS. 2 and 3 illustrate aspects of the SONET and synchronous transmission module (STM) framing formats.
Figure 3:
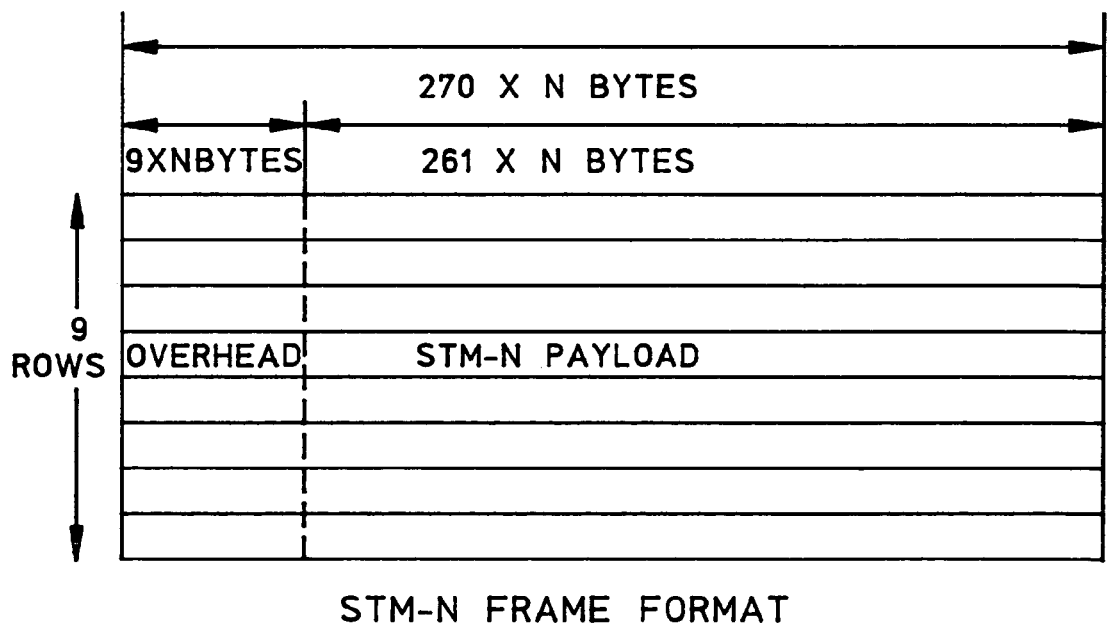

FIGS. 2 and 3 illustrate aspects of the SONET and synchronous transmission module (STM) framing formats. The STM mode is similar to SONET, and is part of the European SDH (synchronous digital hierarchy) general format that is well understood in the art. In its simplest form, the STS-1 (synchronous transfer signal) format can be envisioned as 9 rows of 90 columns of bytes. The first three bytes are SONET overhead, with the following 87 bytes being the payload. Higher frame rates (n order) are created from multiples of the synchronous transfer signal (STS-1) format. That is, an STS-N signal is formed by N byte-interleaved STS-1 signals. Then, the frame format is 9 rows of (90×N) byte columns, including (3×N) bytes of overhead.

The STM-N frame format is 9 rows of (270×N) byte columns, including (9×N) bytes of overhead, see FIG. 3. Typically, the SONET frames are converted for an optical carrier and the links are made through fiber optic lines. However, the SONET format is applicable to electrical carrier mediums, such electrical cable lines. The data rates typically vary from 51.84 to 2488.32 megabytes per second (Mbps), with the payload varying from 50.112 to 2405.376 Mbps.

The SONET section overhead concerns section communications, such as framing information, performance monitoring, and even a voice channel to facilitate the link between repeaters. The line overhead contains information needed for communication to the line terminal equipment. The payload contains the actual information to be communicated. This information also contains the path overhead, which is specific payload monitoring and performance data that is only of interest in context of the SONET system. The overhead of higher order communications links, such as HDLC, is also embedded in the SONET payloads.

The SONET protocol includes a stack of four layers. The photonic layer concerns the interface of electrical and optical signals. The Section layer concerns the STS-N framing, scrambling, and overhead. The Line layer synchronizes and multiplexes the path layer signals, and the Path layer concerns the mapping of services between the path terminals.

The main advantage of the SONET system is that it can directly multiplex many separate slower signals into the high speed SONET format without significant intermediates stages of multiplexing.

Returning to FIG. 1, a self-synchronous scrambling circuit 18 has an input operatively connected to the output of frame generator 12 on line 16. Scrambling circuit 18 scrambles the frame input in a first predetermined transmission encryption pattern and provides an output of encrypted frames on line 20. In this manner, the information to be transmitted is scrambled after it is organized into frames. That is, not only is the payload of the SONET signal scrambled, the entire SONET frame, including overhead sections, is scrambled. Overhead framing sequences A1 and A2, needed by a frame terminal on the receiving end of the SONET communication to identify the received overhead and information in the frame, are typically not scrambled.

A data generator 22 has an output operatively connected to the input of said frame generator on line 14 to provide information to be transmitted. For example, data generator 22 outputs packets of HDLC information in some aspects of the invention, while frame generator 12 accepts and organizes the information and overhead in frames according to SONET protocols.

A self-synchronous de-scrambling circuit 24 has a first input operatively connected to the output of scrambling circuit 18 on line 20. In some aspects of the invention optical or electrical links (not shown) are used to interface scrambler 18 and de-scrambler 24 across long distances. De-scrambling circuit 24 decrypts the received encrypted frames in accordance with the first encryption pattern to provide received frames of information at an output on line 26.

A frame terminal 28 has an input operatively connected to the output of de-scrambling circuit 24 on line 26. Frame terminal 28 removes the overhead information associated which each frame to provide the transmitted information on line 30, whereby the transmitted information initially sent by data generator 22 is recovered. For convenience, only a one-way line is shown in FIG. 1. However, both sides of the link have generating and terminal type equipment. A data or information terminal 32 has a first input operatively connected to the output of frame terminal 28 on line 30 to receive the transmitted information. Frame terminal 28 typically accepts information organized into frames according to SONET protocols, and frame terminal 28 supplies packets of HDLC information.

The present invention encrypts the frame information in the sense that a user cannot predict the outcome of the scrambling process. That is, the sender of a message cannot deliberately send out a predetermined pattern of digits by guessing the state of the scrambler. However, the scrambling process does not encrypt the transmission in the sense that the receiver needs extra information or codes, outside of the scrambled SONET frames, to de-scramble the transmission. Using self-synchronous de-scrambler 24 and frame terminal 28 receiving equipment of the present invention allows the received message to de-scrambled without any special coding information received through other sources. Therefore, the present invention describes a type of encryption for the transmission of information.

Figure 4:
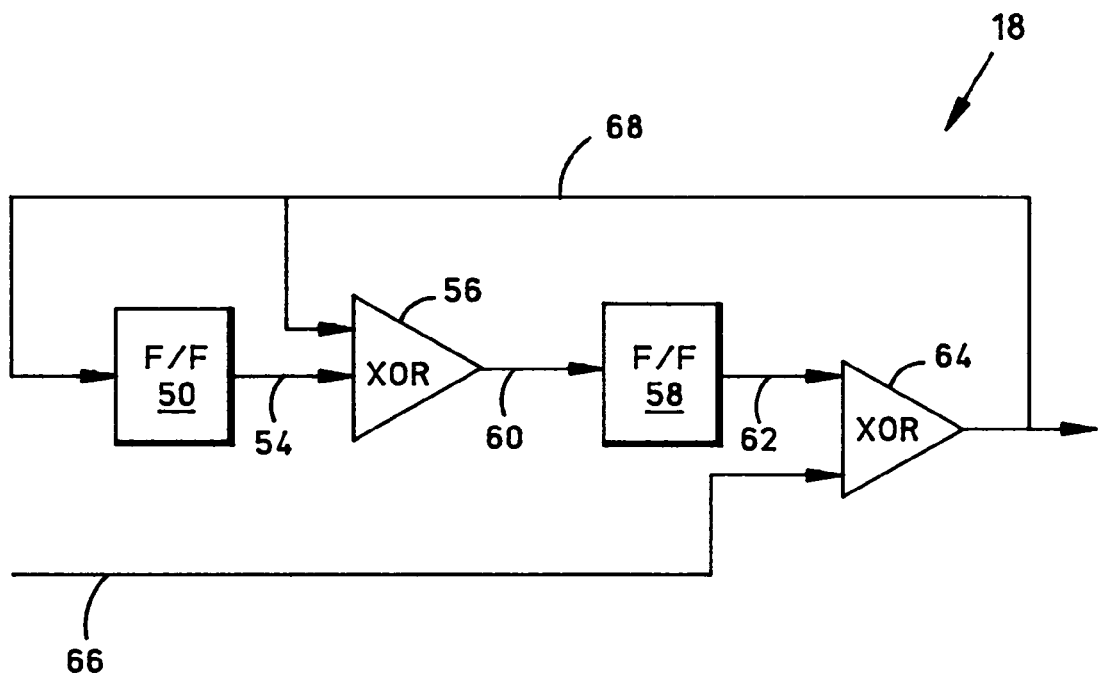
FIG. 4 depicts a simplified version of a self-synchronous data scrambler.

FIG. 4 depicts a simplified version of a self-synchronous data scrambler 18. An example is presented below of a fundamental encryption process suitable for the above-mentioned first transmission encryption process of scrambler 18. A first flip-flop 50, or other such register, is operatively connected on line 54 to an exclusive OR gate (XOR) 56, with the output of XOR 56 operatively connected to the input of second flip-flop 58 on line 60. The output of second flip-flop 58 on line 62 is operatively connected to the input of XOR 64. The input data to be scrambled is input on line 66. The output of XOR 64 on line 68 is the scrambled output. The scrambled output on line 68 is fedback to flip-flop 50 and XOR 56.

To simply demonstrate the scrambling capabilities of the circuit, no signal is input on line 66, and the signals on lines 54 and 62 are arbitrarily assumed to initially both be a "1". Then, the output of XOR 64 on line 68 is a "1", see the truth table of FIG. 4. In the second cycle, line 62 is a "0", so that line 68 becomes a "0". Line 54 remains a "1", and the output on line 60 is a "1". At the third cycle the signal on line 62 is a "1", so the output on line 68 is a "1". Line 54 is a "0" and line 60 is still a "1". In the fourth cycle the signal on line 62 is "1", so the signal on line 68 is a "1". Line 54 is a "1" and line 60 is a "0". The cycle continually outputs the series "1", "0", "1", "1" at output 68. When data is added on line 66, it is scrambled (added in modulo 2) with the output of flip-flop 58 and the result is fedback into scrambler 18, modifying its state. An equivalent de-scrambling circuit (not shown) recovers the data.

By including overhead data that the user does not control in the self synchronous scrambler data input, the scrambler state becomes "encrypted" to the user. An actual scrambler is more complicated than the depicted in FIG. 4, using a longer feedback shift register. The self synchronous scrambler associated with SONET typically has 43 stages ($X^{43}+1$).

Returning to FIG. 2, in some aspects of the invention the frame generator divides each frame into time multiplexed sections including a first frame period 70 when information is included in the frame and a second frame period 72 when overhead is included in the frame. In STS-N frames, sections 70 and 72 are interleaved throughout the frame depending on the value of N. Returning to FIG. 1, frame generator 12 has a second output on line 80 to provide timing information regarding the occurrence of the first and second frame periods, and the occurrence of sub-sections inside sections 70 and 72. Scrambler 18 has a second input operatively connected on line 80 to the second output of frame generator 12. Scrambler 18 selectively scrambling frame sections in response to the received frame period timing information. In this manner, frame sections are selectively encrypted for transmission.

In some aspects of the invention, scrambler 18 encrypts only the information section (72, see FIG. 2) of each frame in response to timing signals received from the second output of frame generator 12. In this manner, the overhead data is not scrambled. This permits the system to remain backward compatible with present existing scrambling systems. The sections of payload concerned with path overhead are typically not scrambled either, when backward compatibility is an issue. Alternately, scrambler 18 encrypts the information section (72, see FIG. 2), and selectively encrypts the overhead sections (70) of each frame in a second predetermined encryption pattern, in response to timing signals received from the second output of frame generator 12. The overhead data is selectively scrambled to further the encryption process. For example, the second encryption pattern may scramble sections of every other overhead section, or every third bit in every section of overhead, to name but a few second encryption patterns.

Likewise, frame terminal 28 divides each received frame into time multiplexed sections including a first frame period when information is included in the frame and a second frame period when overhead is included in the frame (see FIG. 2). Frame terminal 28 has a second output on line 82 to provide timing information regarding the occurrence of the first and second frame periods. De-scrambler 24 has a second input operatively connected to second output of the frame terminal on line 82. De-scrambler 24 selectively de-scrambles frame sections in response to the received frame period timing information, whereby frame sections are selectively decrypted.

In some aspects of the invention, de-scrambler 24 decrypts only the information section of each frame in response to timing signals received from the second output of frame terminal 28, whereby the overhead data is not de-scrambled. Alternately, de-scrambler 24 decrypts the information section, and selectively decrypts the overhead section of each frame in the second predetermined decryption pattern, in response to timing signals received from the second output of frame terminal 28, whereby the overhead data is selectively de-scrambled to further the encryption process.

Alternately stated, in a digital data transmission system of a type that uses logic level transitions for clock recovery, FIG. 1 presents a sabotage prevention system. The system prevents a malicious user from transmitting long strings of "1"s or "0"s that interfere with clock recovery. System 10 comprises a means for generating information 22; a means for assembling the information into frames that include both the information and system overhead for transmission 12; and a means for self-synchronously and continuously scrambling the frames from assembly means 18, subsequent to the assembly of the frames.

Optionally, self-synchronous scrambling means 18, for scrambling the assembled frames, includes control inputs with timing data that are synchronous to at least one overhead bit in the frame to disable scrambling means 18. The advantage of this embodiment is that the operator of the transmission system can modify the scrambler operation so that further uncertainty can be added to the value of the state of the self-synchronizing scrambler on initiation of packet transmission. Also, by setting the controls such that the self-synchronous scrambler is disabled during all overhead bits generated by the frame generator, the present invention is backwards compatible with equipment that performs self-synchronous scrambling on the data sequences prior to their being assembled into frames and, thus, cannot include frame generator overhead bits in the data that is scrambled.

Figure 5:
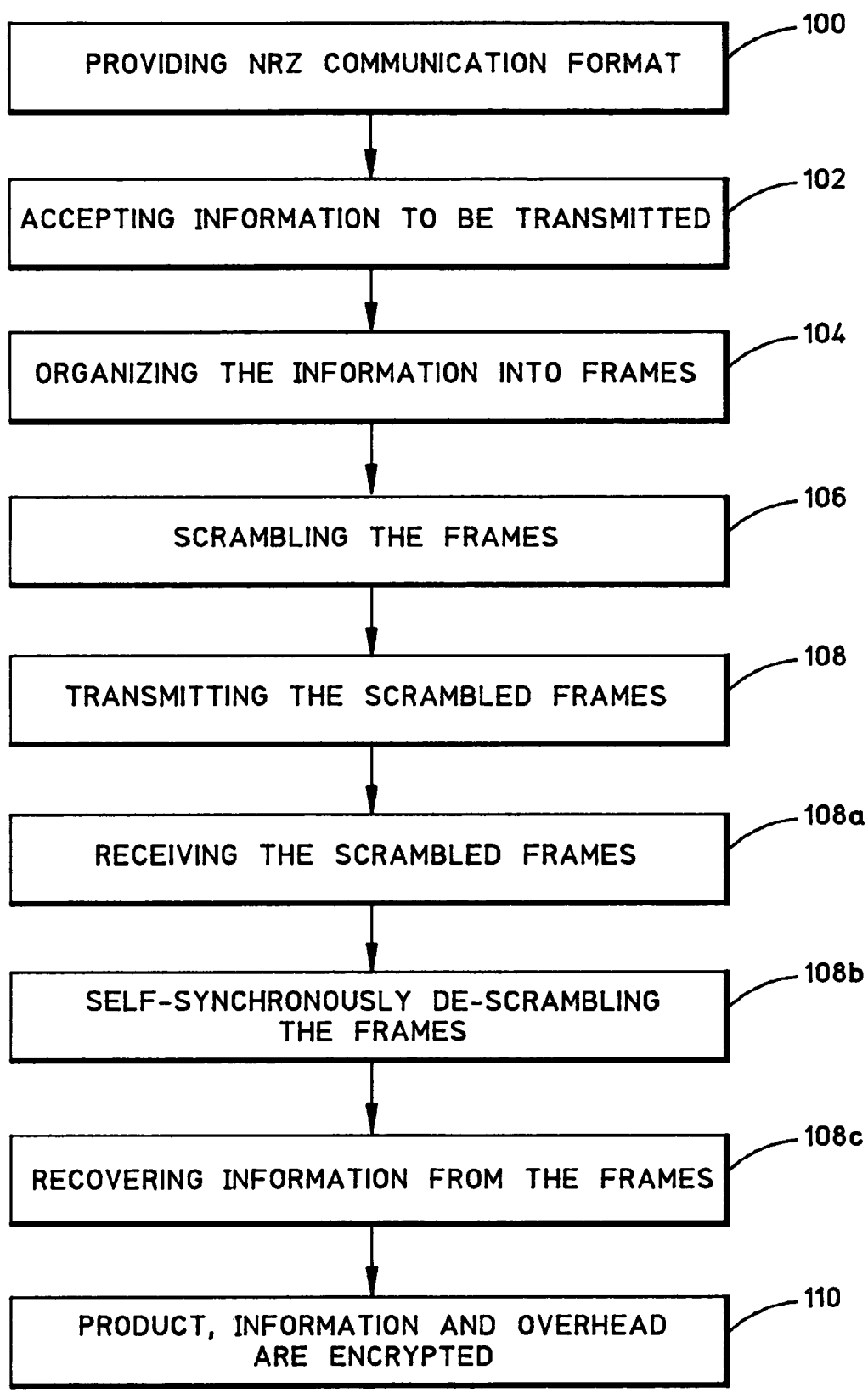
FIG. 5 is a flowchart illustrating steps in a method for encrypting transmissions.

FIG. 5 is a flowchart illustrating steps in a method for encrypting transmissions. Step 100 provides a communication format using logic level transitions to derive the system clock. Step 102 accepts information to be transmitted. Step 104 organizes the information into frames including time multiplexed sections of information and sections of overhead. Step 106 self-synchronously scrambles the frames in a first predetermined encryption pattern. Step 108 transmits the scrambled frames. Step 110 is a product, where the information and overhead data are both encrypted for added security in the transmission of data.

In some aspects of the invention further steps follow Step 108. Step 108a (not shown) receive the scrambled frames. Step 108b (not shown) self-synchronously de-scrambles the frames in accordance with the first encryption pattern. Step 108c (not shown) recovers the information from the frames.

Optionally, Step 104 includes generating timing data to signal the occurrence of the information and overhead sections of the frames. Then, Step 106 includes scrambling the frames in response the timing data signals of Step 104. Step 108c includes generating timing data to signal the occurrence of the information and overhead sections of the received frames, and Step 108b includes de-scrambling the received frames in response the timing data signals of Step 108c. In some aspects of the invention, Step 106 includes scrambling only the information section of each frame. Alternately, Step 106 selectively scrambles overhead sections of the frames in a second predetermined encryption pattern, and Step 108b includes selectively de-scrambling overhead sections of the received frame in accordance with the second encryption pattern. In this manner, the selective scrambling of overhead furthers the encryption process.

A system and method has been provided to self-synchronously scramble SONET style communications. To prevent jamming during initialization, or during times when no data is being transferred, flags and SONET overhead data are scrambled, along with the payload. Timing controls to the scrambler permit this scrambler to be selectively engagable, so that the overhead scrambling becomes a second layer of transmission encryption. Other variations and embodiments of the present invention will occur to those skilled in the art.

What is claimed is:

1. An encryption system for the transmission of information encoded in a format using logic level transitions to derive the system clock, the system comprising;
   a frame generator having a first input to accept information to be transmitted, said frame generator organizing the information into frames including both the information and system overhead, said frame generator having an output to provide frames of information to be transmitted, said frame generator for dividing each frame into time multiplexed sections including a first frame period including information, and a second frame period including overhead, said frame generator having a second output to provide timing information regarding the occurrence of the first and second frame periods; and
   a self-synchronizing scrambling circuit having a first input operatively connected to the output of said frame generator, said scrambling circuit having a second input operatively connected to second output of said frame generator, said scrambling circuit selectively scrambling each frame in response to the received frame period timing information by encrypting the information section of the frame, and selectively encrypting the overhead section of the frame.

2. The encryption system of claim 1 further comprising:
   a data generator having an output operatively connected to the input of said frame generator to provide information to be transmitted.

3. The encryption system of claim 1 further comprising:
   a self-synchronous de-scrambling circuit having a first input operatively connected to the output of said scrambling circuit, said de-scrambling circuit decrypting the received encrypted frames to provide received frames of information at an output.

4. The encryption system of claim 3 further comprising:
   a frame terminal having an input operatively connected to the output of said de-scrambling circuit, said frame terminal removing the overhead information associated which each frame to provide the transmitted information, whereby the transmitted information is recovered.

5. The encryption system of claim 4 further comprising:
   an information terminal having a first input operatively connected to the output of said frame terminal to receive the transmitted information.

6. The encryption system of claim 4 in which said frame terminal divides each received frame into time multiplexed sections including a first frame period when information is included in the frame and a second frame period when overhead is included in the frame, said frame terminal having a second output to provide timing information regarding the occurrence of the first and second frame periods, and in which said de-scrambling circuit has a second input operatively connected to second output of the frame terminal, said de-scrambling circuit for selectively decrypting frame sections in accordance with the first encryption pattern, in response to the received frame period timing information, whereby frame sections are selectively decrypted.

7. The encryption system of claim 6 in which said de-scrambling circuit is for decrypting only the information section of each frame in response to timing signals received from the second output of said frame terminal, whereby the overhead data is not de-scrambled.

8. The encryption system of claim 6 in which said de-scrambling circuit decrypts the information section in accordance with the first encryption pattern, and selectively decrypts the overhead section of each frame in accordance with the second predetermined decryption pattern, in response to timing signals received from the second output of said frame terminal, whereby the overhead data is selectively de-scrambled to further the transmission encryption process.

9. The encryption system of claim 6 in which said frame generator accepts packets of HDLC information, in which said frame generator organizes the information and overhead in frames according to SONET protocols, in which said frame terminal accepts information organized into frames according to SONET protocols, and in which said frame terminal supplies packets of HDLC information.

10. The encryption system of claim 1 in which said scrambling circuit encrypts the information section of each frame in accordance with a first predetermined encryption pattern.

11. The encryption system of claim 1 in which said scrambling circuit encrypts the information section of the frame in accordance with a first predetermined encryption pattern, and selectively encrypts the overhead section of the frame in accordance with a second predetermined encryption pattern.

12. In a communication format using logic level transitions to derive the system clock, a method for encrypting transmissions comprising the steps of:
   a) accepting information to be transmitted;
   b) organizing the information into frames including time multiplexed sections of information and sections of overhead;
   c) self-synchronously scrambling the frames by encrypting the information sections in accordance with the first predetermined encryption pattern and selectively encrypting the overhead sections in accordance with a second predetermined encryption pattern; and
   d) transmitting the scrambled frames.

13. The method of claim 12 further comprising the steps, following Step d), of:
   e) receiving the scrambled frames;
   f) self-synchronously de-scrambling the frames in accordance with the first predetermined encryption pattern, or in accordance with the first and second predetermined encryption patterns; and
   g) recovering the information from the frames.

14. The method of claim 13 in which Step b) includes generating timing data to signal the occurrence of the information and overhead sections of the frames, and in which Step c) includes scrambling the frames in response the timing data signals of Step b).

15. The method of claim 14 in which Step g) includes generating timing data to signal the occurrence of the information and overhead sections of the received frames, and in which Step f) includes de-scrambling the received frames in response the timing data signals of Step g).

16. The method as in claim 15 in which Step f) includes selectively de-scrambling overhead sections of the received frame in accordance with the second predetermined encryption pattern, whereby the selective scrambling of overhead furthers the encryption process.

17. In digital data transmission of a type that uses logic level transitions for clock recovery, a sabotage prevention system comprising:
   a means for generating information;
   a means for assembling the information into frames that include both the information and system overhead for transmission; and
   a means for self-synchronously and continuously scrambling the frames from said assembly means, subsequent to the assembly of the frames, whereby information and overhead are encrypted for transmission;
   in which said self-synchronous scrambling means includes control inputs with timing data that are synchronous to at least one overhead bit in the frame to disable said scrambling means, whereby the scrambling operation becomes modifiable.

* * * * *